Patented Jan. 3, 1939

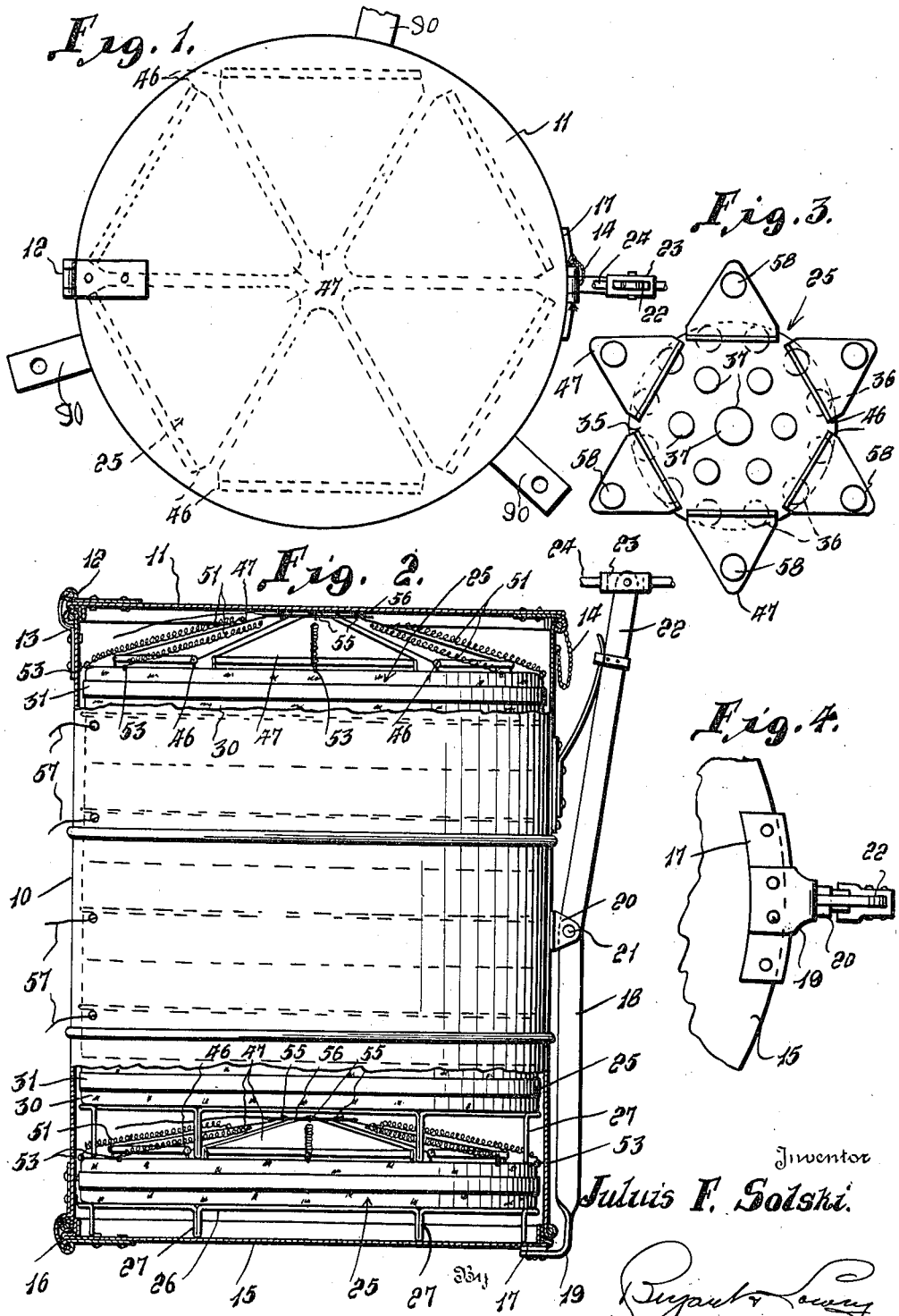

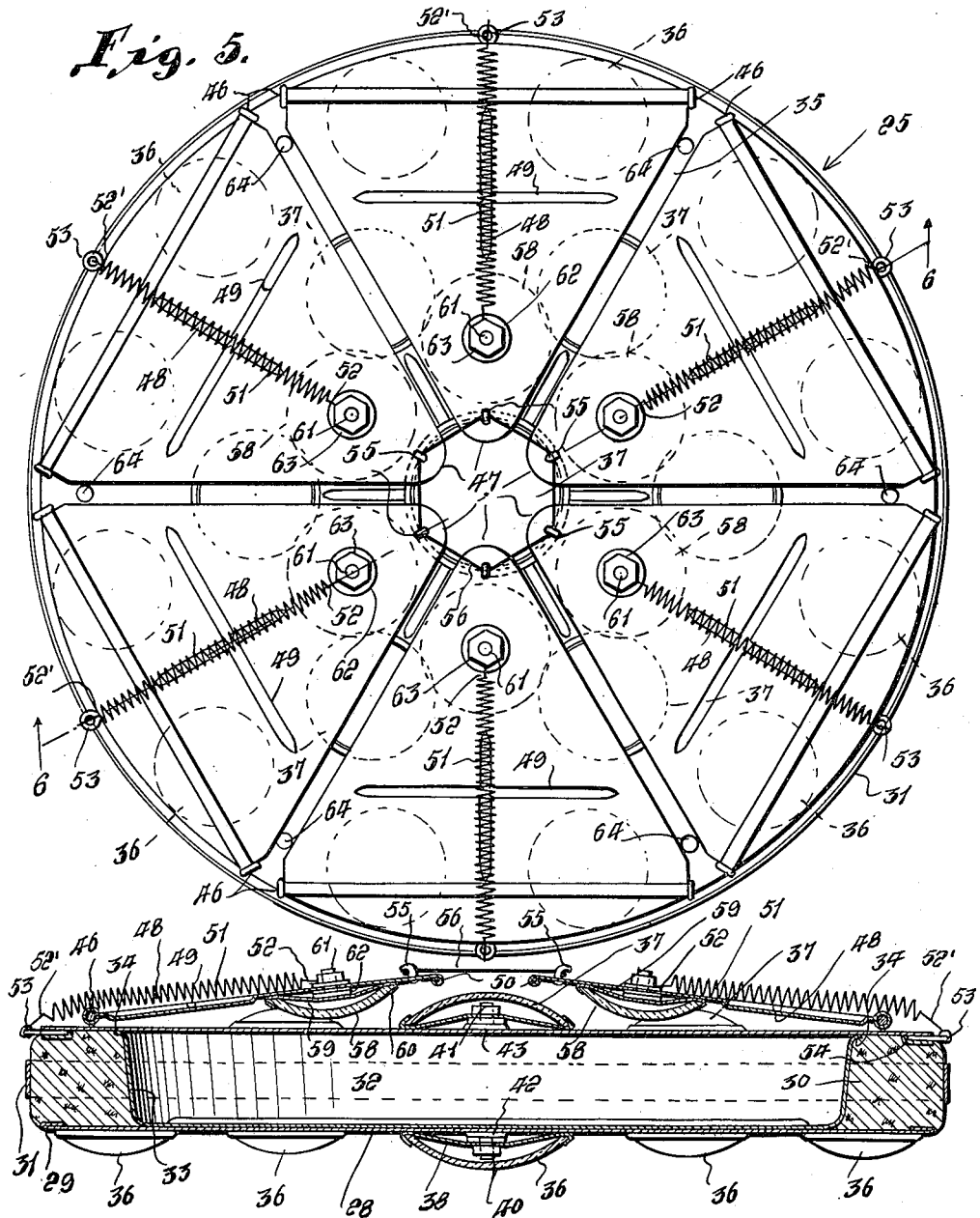

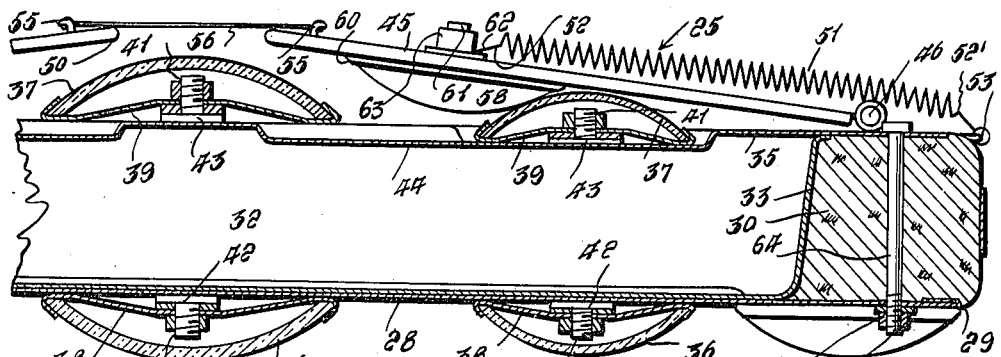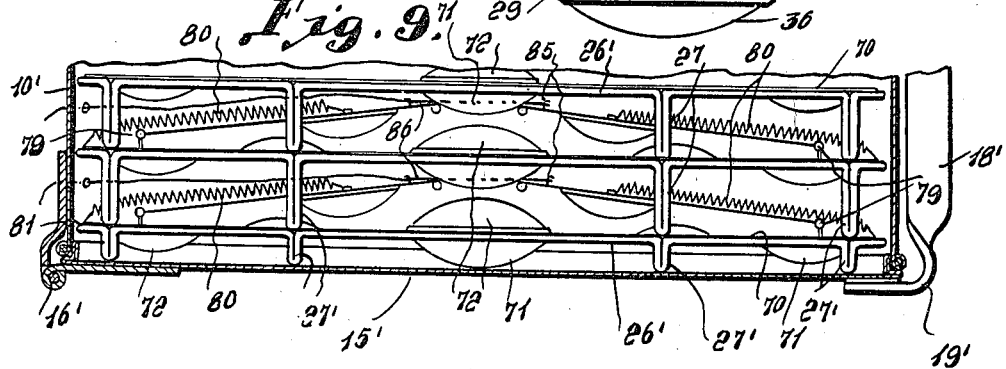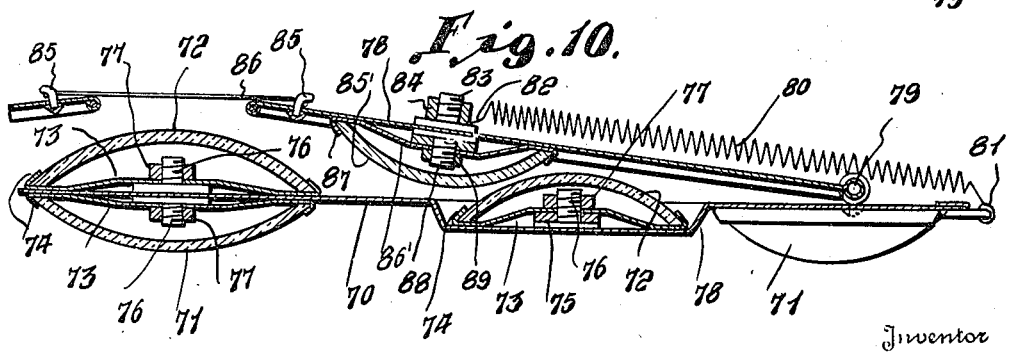

2,142,291

UNITED STATES PATENT OFFICE 2,142,291

AIRCRAFT POSITION INDICATOR

Julius F. Solski, Sacramento, Calif.

Application June 9, 1938, Serial No. 212,811

13 Claims. (Cl. 116—114)

This invention relates to certain new and useful improvements in aircraft position indicators and comprises a device which may be dropped from a plane by the aviator upon the occurrence of a forced landing so that the wreckage can easily be located night and day with the resultant possibility of saving lives.

The primary object of this invention is to provide a device of the above mentioned character including a marker having a series of oppositely disposed wings which may be outfolded when dropped from a plane and which may carry reflecting elements, each having a plurality of reflecting facets.

A further object of the invention is to provide an aircraft position indicator which may be dropped by the aviator at will during an attempted forced landing having a cork ring forming a float so that should the device be dropped upon water while travelling thereover it will float and indicate to a searching party the locality in which the plane was forced down.

A still further object of this invention is to provide an aircraft wreckage position indicator having a series of reflecting elements thereon and provided with folding wings which may be extended during descent of the indicator and which may be contracted when in a stored position within the body of the plane.

A still further object of this invention is to provide an aircraft wreckage position indicator which may be stored in a drum-shaped container located in the plane in such a manner that the indicators will be arranged in stacked relation and may be released one at a time or simultaneously by control means under the influence of the aviator.

Other objects and advantages of the invention will become apparent during the course of the following description, taken with the drawings, wherein, Figure 1 is a top elevational view of the container in which the wreckage indicators are positioned, illustrating the indicators in dotted lines, stacked therein;

Figure 2 is a side elevational view of the container which may be located in a convenient part of a plane body showing the top and bottom sections, broken away, and in cross-section to more clearly illustrate the manner in which the indicators are folded when stored;

Figure 3 is a top elevational view of one of the wreckage position indicators showing the wings extended and illustrating the manner in which the reflecting elements are located;

Figure 4 is a bottom plan view greatly enlarged and shown in detail, depicting the latch device for releasably holding the bottom wall of the container in place when the wreckage indicators are stored therein;

Figure 5 is a top elevational view of one of the aeroplane wreckage position indicators showing the same greatly enlarged and illustrating in detail the manner in which the wings are held in folded position and the tension means for extending the wings;

Figure 6 is a longitudinal cross-sectional view taken on line 6—6 of Figure 5, looking in the direction of the arrows, more clearly illustrating the aeroplane wreckage position indicator in detail and showing the cork ring secured to the air drum forming an increased flotation means therefor;

Figure 7 is a longitudinal cross-sectional view of the wreckage position indicator, showing the manner in which the reflecting elements are held in place and illustrating the complete general structure thereof;

Figure 8 is a longitudinal cross-sectional view illustrating an edge portion of the wreckage indicator to illustrate the manner in which the wings are outfolded when released from their storage receptacle;

Figure 9 is a cross-sectional view of a modified form of the invention wherein a series of wreckage position indicators are stored in a receptacle and said position indicators are more particularly adapted for land use as the float is omitted; and Figure 10 is a fragmentary longitudinal cross-sectional view greatly enlarged and illustrating in detail one of the wreckage position indicators applicable to the modified form of the invention.

In the drawings, wherein for the purpose of illustrating the invention and wherein like reference characters will be employed to designate like parts throughout the same, attention is directed first to Figures 1 to 8, wherein is shown a preferred embodiment of the invention and wherein the reference character 10 will generally be employed to designate a receptacle preferably drum-shaped capable of being positioned in a convenient location with respect to the aeroplane fuselage.

The receptacle 10 is provided with a top with a hinged cover 11 having a hinge connection 12 with the upper edge of the receptacle 10 as at 13. The free swinging end of the cover 11 may be provided with a chain 14 capable of anchoring the cover against displacement. The bottom of the receptacle 10 is provided with a hinged member 15 secured to the receptacle 10 by means of a hinge joint as at 16 and the free swinging edge of the hinged bottom 15 is adapted to be held in place by means of an arcuately curved latch plate 17 mounted on the lower end of a pivoted lever 18 as at 19. A fulcrum 20 is provided for the lever 18 and is attached to the receptacle 10 upon the median line thereof. A pivot pin 21 extends through the fulcrum 20 and pivoted lever 18 so that the lower end of the lever 19 may move into and out of the path of the hinged bottom 15. The upper end of the pivoted lever as at 22 may be provided with a connection 23 with a suitable control rod 24 capable of receiving a sliding movement by means of an operating lever under the influence of the aviator and in close position to the aviator's seat.

The container 10 is adapted to hold a series of wreckage position indicators in stacked relation and designated generally by the reference character 25. Each wreckage position indicator when in stored position within the receptacle 10 is spaced from the one above by means of a suitable wire frame spacing element 26 having spacing legs or projections 27.

Also, each wreckage position indicator comprises a bottom disk-shaped member 28 having the marginal edges return bent as at 29 to provide a finished edge terminating adjacent the edge of a cork float ring 30 having a reinforcing band 31. An inner cup-shaped air drum 32 is pressed into position so that the flange of the wall 33 engages the inner wall of the cork ring 30 and terminates adjacent the upper surface thereof as at 34. The contacting surface of the cup-shaped element or air drum 32 may be soldered to the bottom disk member 28 or otherwise fastened in place. A top disk-shaped member 35 is similarly fastened in place and has its outer edge extending beyond the upper portion of the flange 34 of the cup-shaped member 32 and confining the top surface of the cork ring 30.

Upon the top and bottom disk-shaped plates 28 and 35 are provided reflecting elements 36 and 37 respectively which may comprise colored glass or any suitable material presenting a reflecting surface which will be easily visible by a searching party of ships. Each reflecting element is mounted in suitable cup-shaped members 38 and 39 respectively and said cup-shaped members may be anchored to the bottom and top disk members 28 and 35 by means of suitable nuts and bolts 40 and 41. The inner ends of the bolts may have enlarged heads as at 42 and 43 soldered or spot welded in place upon the respective disk members. It will be noted that the central-most reflecting elements are slightly increased in diameter than the ones toward the periphery of the indicator but the construction thereof is the same in each instance, as will be noted more clearly in Figure 7.

Certain reflecting elements 36 and 37 may be mounted in recessed portions 44 in the top wall or disk member 35 to produce a more compact unit and to allow the folding wings or plates 45 to be folded more closely to the top member 35.

The folding wings or plates 45 are preferably sector-shaped as shown in Figures 3 and 5 and have their outer edges hingedly connected to the top disk plate 35 as at 46. The inner ends when the plates are folded as at 47 terminate adjacent the central reflector element 37. Each plate may be provided with reinforcing recesses 48 to strengthen the folding plates and intersecting the reinforcing recesses 48 are transverse reinforcing recesses 49. The marginal edges of the folding plates 45 may be rolled as at 50 to further strengthen the structure of the folding plates.

Coil springs 51 are provided for normally urging the folding plates 45 to the position shown in Figure 3 and said coil springs have their inner ends as at 52 secured to suitable fastening elements while the opposite or free ends of the coil springs 52' are fastened to pins 53 driven into and anchored in suitable socket members 54 formed in the edge of the top disk 35. The inner ends of each folding plate is provided with a hook 55 around which an elastic band 56 may be passed for the purpose of folding the folding wings or plates 45 in the position shown in Figures 1, 2, 5, 6, and 7 when in a stored position. A string 57 may be connected to the elastic band 56 for the purpose of rupturing the same when it is desired to release one or more of the indicators.

Each folding wing or plate 45 is provided on its top surface when extended with reflector element 58 which is similar in constructon to the reflector elements 36 and 37 secured to the upper and lower disk-shaped plates 28 and 35. The reflector elements 58 are mounted in cup-shaped members 59 having the outer edges as at 60 folded over the edge of the reflector 58 and said cup-shaped elements 59 are anchored to the folding wings or plates 45 by means of screw threaded studs 61 having their inner ends as at 62 welded or otherwise secured to the cup-shaped elements 59. A nut 63 is threaded on the screw threaded stud 61 and anchors each of the cup-shaped elements 59 and 58 in place.

To assist in holding the upper and lower disks 28 and 35 in place upon the top and bottom walls of the float ring 30, bolts 64 may extend through the marginal edges of the rings and pass through the float 30 so that the free end of the bolt as at 56 may receive a nut on its threaded end as at 66.

Attention is now directed to the modified form of invention in Figures 9 and 10, wherein the invention is limited to land use only and the float is omitted. The container 10' is substantially identical to the one intended for use in the form of the invention in Figures 1 to 8 inclusive and includes a releasable bottom 15' hinged as at 16'. A latch 19' formed on the lower end of a latch bar 18' releases the bottom for the purpose of dropping all of the indicators at one time.

The indicator shown in the modified form, comprises a disk 70 having reflector units on both faces thereof as at 71 and 72 and the reflectors 72 are mounted in a cup-shaped holder 73 having the edges overturned as at 74 for tightly clamping the reflector 72 in place. The cup-shaped member 73 is secured to the disk 70 by means of a screw threaded stud 75 secured to the disk by welding or the like so that the screw threaded portion 76 will extend through the cup-shaped member 73 and be anchored in place by means of the nut 77. It will be noted that the upper reflectors 72 are mounted in recesses 78 formed in the disk 70 and it is intended to fasten all of the reflectors in place in the same manner as by means of a screw threaded stud and a nut connection. The central reflectors 71 and 72 are mounted on opposite sides of the disk 70 in a back to back fashion, while the other surrounding reflector elements may be arranged in staggered positions.

The indicator disk in the modified form shown in Figure 10 is provided with the folding wings 78 which are similar to the wings 45 shown in Figures 1 to 8 inclusive. The wings are preferably sector-shaped and have their wide portion hinged as at 79 to the peripheral portion of the disk 70 so that they may unfold and extend beyond the periphery thereof. A coil spring 80 has one of its ends fastened as at 81 to the edge of the disk 70 while the inner edge as at 82 is fastened to a threaded stud 83 and anchored in place by a nut 84. The extreme inner end of each folding wing is provided with a hook 85 for receiving a rubber band or the like as at 86 in order to hold the free ends of the wings in a folded position while the devices are stored in the container.

Each of the folding wings 78 is provided with reflector element 85' held in cup-shaped element 86' by bending the edges thereof over the edges of the reflector as at 87. Each cup-shaped element 86' is secured to the folding plate or wing 78 by means of a screw threaded stud 88 and the locking nut 89.

When the aeroplane wreckage indicators 70 are mounted or stored within the container 10' they are held in spaced relation by means of spacers 26' having spacing legs 27' in a fashion similar to the spacers disclosed in Figure 2.

If desired, the protected face of each reflector may be coated with luminous paint so that the markers would be visible at night and at the same time be clearly visible in the day by reflecting the rays of the sun or other light.

In the land water indicators, the body portion may be enameled white for added visibility while for snow indicators, the body is preferably colored black. It should be noted that the containers such as indicated at 10 and 10' in the drawings are to be secured to the inside bottom of the airship in any suitable manner such as by means of perforated lugs 90 carried by the bottom of the container and each lug preferably having a bolt, not shown, for securely holding the container to the bottom of the aircraft for the safety of which it is provided. Obviously different forms of securing means between the container and aircraft might be employed as well as a securing lock for the chain 14 and the pivoted lever 22 if the same should become desirable.

It is to be understood, that the form of the invention herewith shown and described is to be taken as the preferred embodiment of the same and that various changes in the shape, size, and arrangement of parts may be resorted to without departing from the spirit and scope of the invention as claimed.

I claim:

1. A wreckage position indicator of the character described, comprising a disk-shaped member, a series of wings hinged to the periphery of the disk-shaped member and adapted to be confined within the circumference thereof when in a folded position and means for swinging the wings beyond the periphery of the disk-shaped member when extended.

2. A wreckage position indicator of the character described, comprising a disk-shaped member, a series of wings hinged to the periphery of the disk-shaped member and adapted to be confined within the circumference thereof when in a folded position, a series of reflector elements secured to the disk-shaped member and hinged wings and means for swinging the wings beyond the periphery of the disk-shaped member when in operative position.

3. A wreckage position indicator of the character described, comprising a disk-shaped member, a series of sector-shaped wings hinged to the peripheral edge of the disk-shaped member so that the free swinging end may be confined within the perimeter of the disk-shaped member, means for holding the sector-shaped wings in a folded position, means for extending the wings when the first named means is released and a series of reflector units secured to the disk-shaped member and the sector-shaped wings which will be exposed when the wings are in a position extending beyond the perimeter of the disk-shaped member.

4. A wreckage position indicator of the character described, comprising a disk-shaped member, a series of sector-shaped wings hinged to the peripheral edge of the disk-shaped member so that the free swinging end may be confined within the perimeter of the disk-shaped member, means for holding the sector-shaped wings in a folded position, spring means for moving the sector-shaped wings to an extended position when the first mentioned means is released, a series of reflector units mounted on the disk-shaped member and a series of reflector units mounted on the sector-shaped wings adapted to be protected when in a folded position and exposed when the wings are in an extended position.

5. A wreckage position indicator of the character described, comprising a metal plate having a series of reflecting units thereon, a plurality of folding wings attached to the plate and adapted to extend beyond the edges of the plate when in an operative position, a series of reflector units secured to the folding wings adapted to be exposed when the wings are extended, spring means for moving the wings to an extended position and releasable means for holding the wings in a folded position within the confines of the metal plate.

6. A wreckage position indicator of the character described, comprising a metal plate, a series of reflector units mounted on said plate, certain reflector units being mounted in recesses below the plane of the metal plate, a series of hinged wings secured to the edges of the metal plate adapted to be folded within the confines thereof, spring means for extending the wings beyond the edges of the metal plate, reflector units mounted on the hinged wings adapted to be protected when the wings are in a folded position and exposed when in an extended position and releasable means for holding the inner ends of the wings in a folded position centrally of said metal plate.

7. A wreckage position indicator, comprising a disk-shaped plate, a series of sector-shaped wings having the widest portion hinged adjacent the periphery of the disk-shaped plate so that the tapering portion will extend toward the center of the disk-shaped plate, a series of reflector units carried by the disk-shaped plate, a series of reflector units carried by the wings adapted to be confined and protected when the wings are in a folded position and exposed when in an extended position, spring means for extending the wings and releasable means for holding the wings in a folded position.

8. A wreckage position indicator, comprising a float, a series of reflector units secured to said float, hinged wings secured to the edges of the float adapted to be folded within the confines of the float, reflector units carried by the hinged wings, means for moving the wings to an extended position and releasable means for holding the wings in a folded position within the confines of the float.

9. In a position wreckage indicator of the character described, comprising a disk-shaped float member including a pair of spaced disk plates, a buoyant float ring mounted between the plates, means for holding the plates and buoyant ring in position, a series of reflector units secured to the exposed faces of the spaced disk plates, a series of sector-shaped wings having the widest portion thereof hinged to the peripheral edge of the top disk plate, means for holding the tapered portions of the sector-shaped wings releasably in folded position, means for moving the sector-shaped wings to an extended position and a series of reflector units carried by the sector-shaped wings adapted to be confined and protected when the wings are in a folded position and exposed when the wings are in an extended position.

10. In combination with a receptacle adapted to be carried by a plane or vessel, of a series of wreckage position indicators mounted therein, each comprising a disk-shaped float member having a series of wings hinged to the peripheral edges thereof and foldable thereon, reflector units carried by the disk-shaped float member and hinged wings and means for extending the hinged wings when released from the receptacle.

11. In combination with a receptacle adapted to be carried by a plane or other vehicle, of a series of wreckage position indicators arranged in said receptacle in stacked relation, each comprising a disk-shaped float member, a series of wings hinged to the peripheral edges of the float member adapted to be folded within the confines thereof, reflector units carried by the float member and hinged wings, means for releasably holding the hinged wings in a folded position within the confines of the disk-shaped float member and spring means for urging the wings beyond the periphery of the float member to extend radially thereof.

12. In combination with a receptacle having a releasable bottom adapted to be carried by a plane, of a series of wreckage position indicators arranged in said receptacle in stacked relation, adapted to be released therefrom in succession simultaneously, each position indicator including a pair of spaced disk-shaped plates, a cup-shaped spacing member sandwiched between the plates, a buoyant float ring extending around the cup-shaped member and mounted between the edges of the disk-shaped plates, reflector units carried by the disk-shaped plates, a series of sector-shaped wings having the widest portion thereof hingedly secured to the peripheral edge of the uppermost disk-shaped plate, means for holding the inner tapered portions of the sector-shaped wings within the confines of the uppermost disk-shaped plate, a series of reflector units secured to the sector-shaped wings adapted to be protected when the sector-shaped wings are in a folded position and exposed when in an extended position and spring means for urging the sector-shaped wings radially beyond the perimeter of the disk-shaped plates.

13. In combination with a receptacle having a releasable bottom wall adapted to be carried by a plane or vessel, of a series of wreckage position indicators arranged in the receptacle in stacked relation, each wreckage position indicator comprising a pair of spaced disk-shaped plates, a cup-shaped spacing member mounted between the disk-shaped plates and terminating adjacent the peripheral edge thereof, a buoyant float ring mounted between the spaced disk-shaped plates and surrounding the cup-shaped spacing member, a series of reflector units carried by the exposed faces of the disk-shaped plates, a plurality of sector-shaped wing members hingedly secured to the peripheral edge of the uppermost disk-shaped plate adapted to extend beyond the edge thereof in a radial fashion, reflector units carried by the hinged sector-shaped wings, spring means for urging the same in a radial direction and releasable means for holding the sector-shaped wings in a folded position within the confines of the disk-shaped plates.

JULIUS F. SOLSKI.